Oct. 8, 1935.  R. J. McFALL ET AL  2,016,507

ELECTRICALLY CONTROLLED VALVE AND METHOD OF OPERATING THE SAME

Filed March 24, 1931  2 Sheets-Sheet 1

Inventors
Robert J. McFall
Frank H. Roland,
By Stone, Boyden, Mack & Hahn,
Attorneys

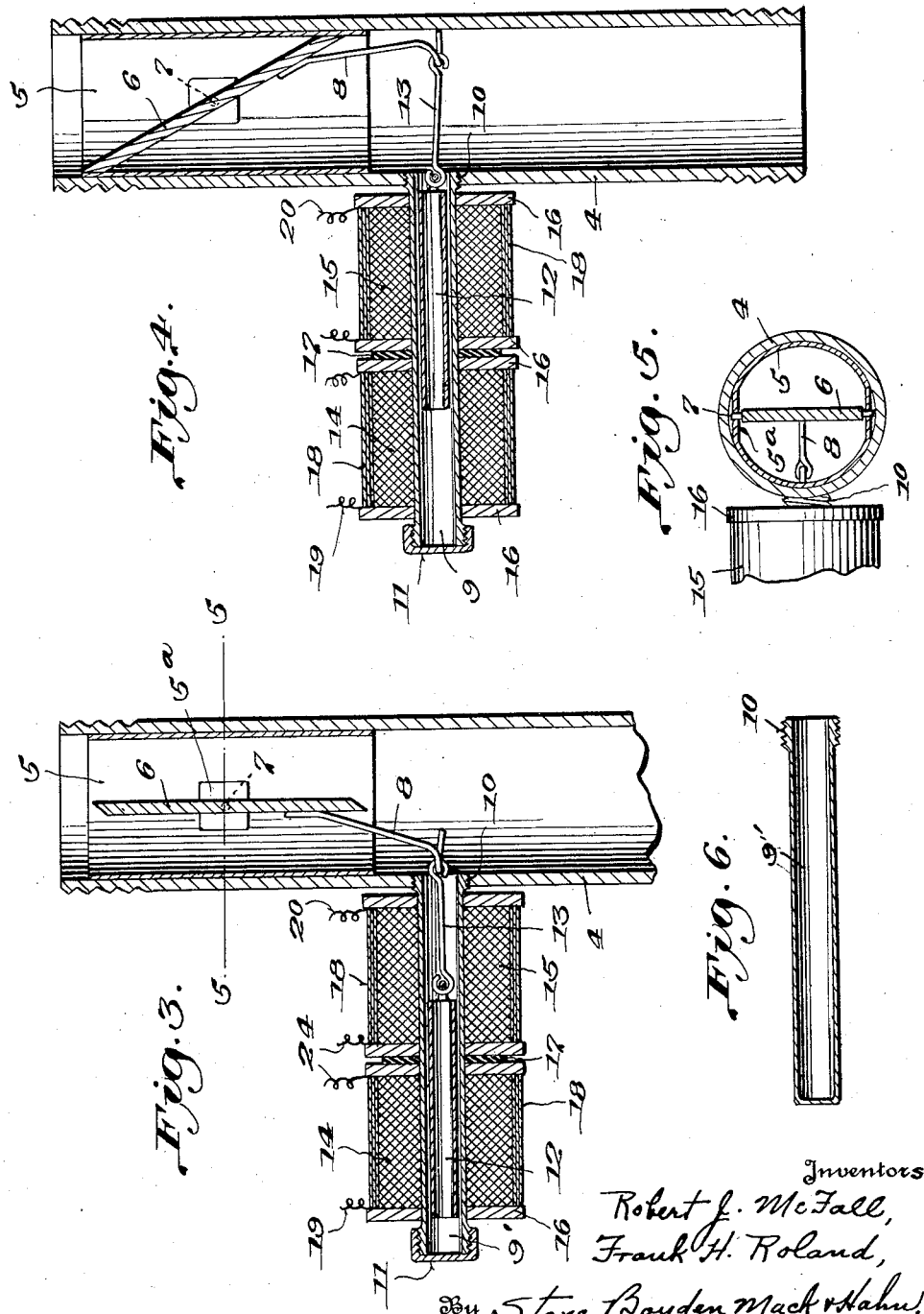

Patented Oct. 8, 1935

2,016,507

UNITED STATES PATENT OFFICE 2,016,507

ELECTRICALLY CONTROLLED VALVE AND METHOD OF OPERATING THE SAME

Robert J. McFall, Cherrydale, and Frank H. Roland, Ashton Heights, Va.

Application March 24, 1931, Serial No. 524,932

6 Claims. (Cl. 137—139)

This invention relates to electrically controlled valves and more particularly to such valves when used in connection with a thermostat for regulating the temperature of a room or other space heated or cooled by a circulating fluid medium flowing through the valves.

It has heretofore been proposed to provide automatic temperature responsive means for regulating the flow of a heating fluid through a radiator or the like, but such means have for the most part been located immediately adjacent the valve in the pipe or conduit through which the heating medium is flowing, and it has thus been very difficult to shield such a device from the heat of the fluid medium itself so that it will be truly responsive to the temperature of the air in the room being heated. One object of the present invention therefore is to provide automatic means for controlling a radiator valve or the like which shall comprise a thermostat located at a point remote from the valve itself and the radiator, so that such thermostat will respond accurately to the temperature of the air in the room being heated.

It has furthermore been proposed to provide electromagnetic means for operating a valve controlling the flow of fluid to a radiator or the like, but in such prior attempts the valves have had a stem or other operating element extending through a packed gland or stuffing box, and this has proven a constant source of trouble on account of leakage. Another object of the present invention is to provide electromagnetic means for opening and closing a valve of this character, located in a conduit conveying a fluid, in which organization no part of the valve extends through or outside of the conduit, and no packed joints or glands whatever are employed.

A still further object of the invention is to provide means, in combination with an electromagnetically operated valve no part of which projects outside of a closed conduit, whereby the circuit through which the thermostat controls the energization of the electromagnetic means is permited to remain closed for but a relatively brief interval, so that only a small amount of current is used up, and overheating of the electromagnetic means is prevented.

With the above and other objects in view, and to improve generally upon the details of such apparatus, the invention consists in the construction arrangement and combination of parts hereinafter described and claimed, and illustrated in the accompanying drawings, forming part of this specification, in which;

Figs. 3 and 4 are vertical central sections through the parts shown in Fig. 2, the two views illustrating the parts in different positions;

Fig. 5 is a transverse section substantially on the line 5—5 of Fig. 3, and,

Fig. 6 is a longitudinal section through a slightly modified form of one of the parts shown in Figs. 3 and 4.

Figures 1, 2:
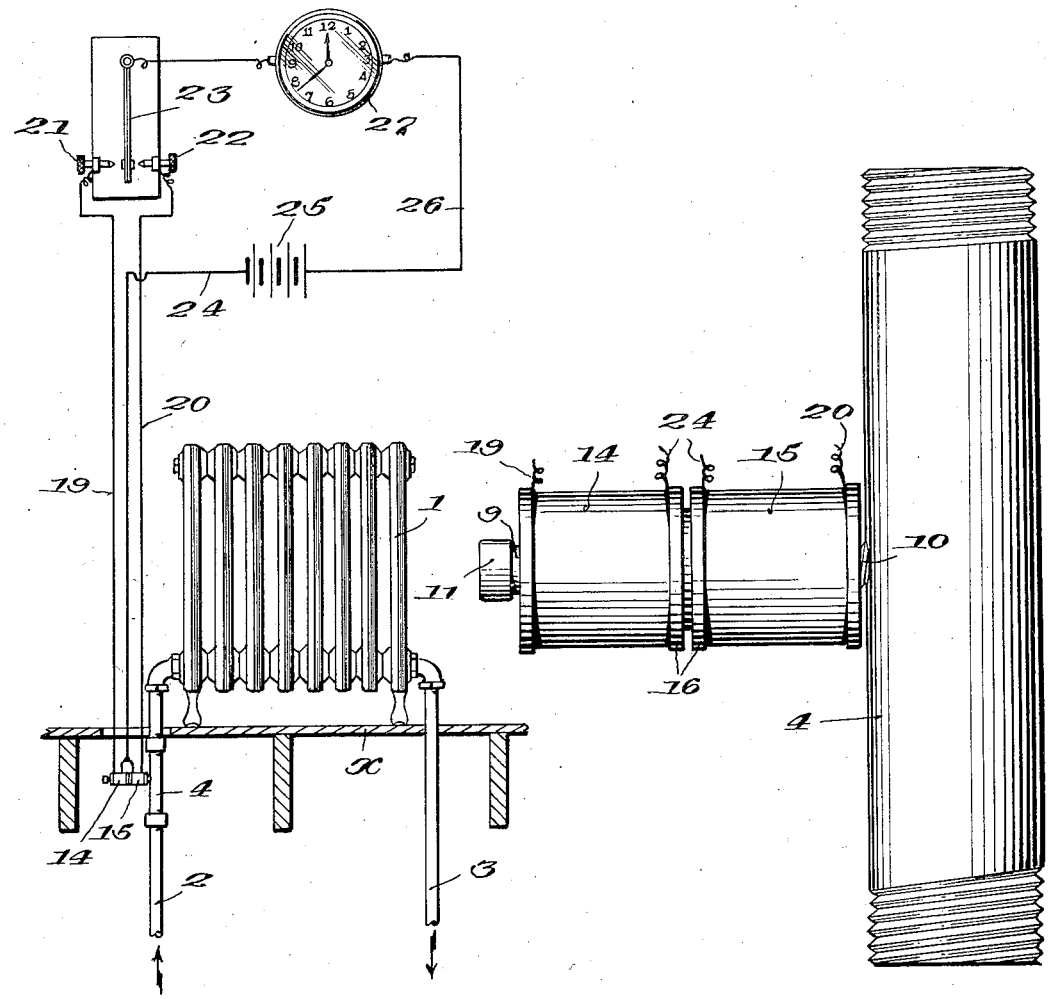
Fig. 1 is an assembly view showing a radiator and thermostat, and illustrating the circuits by which the thermostat controls the electromagnetically operated valve.
Fig. 2 is a side elevation showing a section of pipe in which the improved valve is mounted, and illustrating the improved electromagnetic operating means associated therewith.

Referring to the drawings in detail, I designates a heat exchange device which may be either for heating or cooling the surrounding air, but which for simplicity will be described as a radiator. Although the invention is capable of use in connection with steam or vapor systems it is particularly adapted for hot water heating systems. In Fig. 1 the pipes or conduits conveying the heating fluid to and from the radiator are indicated at 2 and 3.

4 designates a nipple or short section of pipe in which the improved valve is enclosed. Preferably the valve itself, which is of the butterfly type as shown at 6 in Figs. 3 and 4, is pivotally mounted at 7 in a relatively thin sleeve 5 which fits snugly within the pipe nipple 4 and may be soldered or welded thereto. In order to provide bearings for the pivot pins 7 of the valve, small areas at opposite sides of the sleeve 5 may be slightly flattened or pressed in as illustrated at 5a in Figs. 3 and 5. Rigidly secured to the valve is an arm 8 by means of which it may be swung on its pivot into open or closed position as shown in Figs. 3 and 4 respectively.

Set into an opening in the side of the pipe section 4 adjacent the sleeve 5, as by means of screw threads 10 is a relatively small tube or branch conduit 9 having its outer end closed as by means of a screw cap 11. Instead of using a cap such as 11, the tube may be formed with a permanently closed outer end, as illustrated at 9' in Fig. 6. It will be noted that the tube 9 extends horizontally, as shown in Figs. 3 and 4.

In either case this tube 9 is relatively thin and is made of brass or other non-magnetic material.

Arranged to slide freely inside of the tube 9 and immersed in the fluid contained in the conduit 4 is a core or plunger 12, of magnetic material, this core or plunger being connected with the arm 8 by means of a rod or link 13. The arm 8 is of such length that its end lies substantially on the axis of the tube 9, so as to permit the link 13 to freely enter such tube as shown in Fig. 3. The interior of the tube 9 is thus in open communication with the interior of the conduit 4.

Surrounding the tube 9 are a pair of solenoids 14 and 15. The coils of insulated wire forming these solenoids are preferably wound between discs or spools heals 16 of iron or other magnetic material, the two adjacent discs being separated if desired by a washer 17 of non-magnetic material.

In order to still further increase the efficiency of the solenoids the windings 14 and 15 may be covered by and enclosed in a wrapping or casing of magnetic material such as sheet iron, as indicated at 18 in Figs. 3 and 4.

It will thus be seen that with the core 12 in the position shown in Fig. 3 a magnetic circuit of comparatively low reluctance is formed through the core, the discs 16 and the magnetic casing 18 of solenoid 14, and the same is true of solenoid 15 when the core is in the position shown in Fig. 4. Therefore the energization of these solenoids by a comparatively small current will produce a relatively strong magnetic pull on the core or plunger 12, it being understood that when the parts are in the position shown in Fig. 3 and the solenoid 15 is energized, the core will be shifted to the position shown in Fig. 4 in which the valve 6 is closed, while, if the solenoid 14 is energized, the core will be drawn out into the position shown in Fig. 3, and the valve 6 opened. The core 12 moves horizontally in either direction, as shown in Figs. 3 and 4, with the result that the work of both solenoids 14 and 15 is substantially equal.

In practice the solenoids 14 and 15 and the associated valve are preferably located beneath the floor $x$ as shown in Fig. 1, although they may be disposed above the floor adjacent the usual manual valve. Circuit wires 19 and 20 extend from one terminal of each of the solenoids to contact points 21 and 22 of a thermostatic switch 23. The other terminals of the solenoids are connected together and to a wire 24 which extends through a battery 25 or other source of current and wire 26 back to the thermostat 23. Thus when the thermostatic switch 23 is deflected by changes in temperature into engagement with one or the other of the contacts 21 and 22, either the solenoid 14 or 15 is thereby energized and the valve 6 correspondingly shifted to either open or closed position, as may be required.

In prior arrangements of electromagnetically operated devices in which the moving part is accessible, it has frequently been proposed to cause the movement of such movable part to open the circuit of the electromagnetic means after the desired movement has taken place, so as to prevent waste of current and overheating. In the present case, however, all of the moving parts are completely enclosed within the chamber consisting of the conduit 4 and branch or tube 9 and being thus inaccessible it is impossible to cause such moving parts to actuate a circuit controller. Hence it has been necessary to devise other means for limiting the time during which the circuit of either solenoid remains closed.

One way of doing this is by means of a periodic or time controlled circuit interrupter operated by means of a clock or the like such as indicated at 27 in Fig. 1. This interrupter is placed in series with the battery and common return from the two solenoids, and is preferably so constructed that the circuit through the thermostatic switch remains normally open, but is closed momentarily and periodically at regularly recurring intervals. Thus the clock mechanism may be so constructed as to close the circuit for one or two seconds every ten or fifteen minutes, for example.

With a circuit interrupter operating in this way, it is obvious that if, during the interval between successive closings of the circuit the thermostatic switch should come into engagement with the contact 21, for example, the next momentary closing of the circuit would result in the energization of the solenoid 14 and the shifting of the valve to open position thus admitting the heating medium to the radiator. If, by the time the next closing of the circuit occurred, the room was still too cool, and the thermostat had not been moved, a second impulse would be sent through the solenoid 14 but this would have no effect. Finally after sufficient time had elapsed the room would perhaps become too warm and the thermostatic switch would move into engagement with the contact 22. Thereupon, at the next closing of the circuit by the clock mechanism 27 the solenoid 15 would be momentarily energized and the valve shifted to closed position, so as to shut off the heating fluid. Thus by providing the periodic circuit closer or interrupter 30 the energization of the solenoids is only momentary and current is thus saved and overheating prevented.

In practice it is proposed to provide a thermostat and valve such as 6 in connection with each individual radiator in a house. A single clock mechanism and periodic circuit closer may however be employed in the common return of all of the solenoids and thus suffice for the entire insulation.

What we claim is:

1. The combination with a conduit for conveying a fluid, of a pivoted, balanced butterfly valve all moving parts of which are mounted and wholly enclosed within said conduit, and means for positively swinging said valve on its pivot in either direction by the agency of magnetic force applied externally of said conduit including an offset extending substantially horizontally from said conduit and having the interior thereof in ported communication with the interior of said conduit, a solenoid core element within said offset and connected to said valve to operate the latter, and a source of magnetic force exterior to said offset and conduit for actuating said solenoid core element and said valve.

2. In a hot water house heating system, the combination with a conduit for conveying a liquid, of a metallic sleeve fitting within the same, a butterfly valve pivotally mounted and wholly enclosed within said sleeve adapted to seat thereagainst said valve having no moving part extending outside of said conduit, and electromagnetic means for swinging said valve on its pivot including a tube extending from said conduit and in ported communication with the interior thereof, a solenoid core element within said tube and connected to said valve to operate the latter and a source of magnetic force exterior to said tube and conduit for actuating said solenoid core element and said valve.

3. The combination with a conduit having a passageway therein for conveying a fluid, of a pivoted balanced valve all moving parts of which are mounted and wholly enclosed within said passageway, and means for positively moving said valve into either the open or closed position by the agency of the magnetic force applied externally of said conduit including an offset extending substantially horizontally from said conduit and having the interior thereof in ported communication with the interior of said conduit, a solenoid core element within said offset and connected to said valve to operate the latter, and a source of magnetic force exterior to said offset and conduit for actuating said solenoid core element and said valve.

4. In a hot water house heating system, the combination with a conduit for conveying a liquid, of a metallic sleeve associated with said conduit, a pivoted valve mounted and wholly enclosed within said conduit and said sleeve and adapted to seat thereagainst, said valve having no moving part extending externally of said sleeve and conduit, and electromagnetic means for moving said valve on its pivot including a tube extending from said conduit and in ported communication with the interior thereof, a solenoid core element within said tube and connected to said valve to operate the latter and a source of magnetic force exterior to said tube and conduit for actuating said solenoid core element and said valve.

5. In a hot water house heating system, the combination with a conduit having a bore therethrough for conveying a liquid, of a metallic sleeve separably insertable within said bore, a valve pivotally mounted and wholly enclosed within said sleeve and adapted to seat thereagainst, said valve having no moving part extending outside of said conduit, and electromechanical means for swinging said valve on its pivot including a tube extending from said conduit and in ported communication with the interior thereof, a solenoid core element within said tube and connected to said valve to operate the latter and a source of magnetic force exterior to said tube and conduit for actuating said solenoid core element and said valve.

6. The combination with a conduit for conveying a fluid, a pivoted, balanced butterfly valve, all moving parts of which are mounted and wholly enclosed within said conduit, an electromechanical means for positively swinging said valve on its pivot in either direction by force applied externally of said conduit including an offset extending substantially horizontally from said conduit and having the interior thereof in ported communication with the interior of said conduit, a solenoid core element within said offset and connected to said valve to operate the latter, and a source of magnetic force exterior to said offset and conduit for actuating said solenoid core element and said valve.

ROBERT J. McFALL.
FRANK H. ROLAND.